United States Patent [19]

Wycech

[11] Patent Number: 4,978,562
[45] Date of Patent: Dec. 18, 1990

[54] COMPOSITE TUBULAR DOOR BEAM REINFORCED WITH A SYNTACTIC FOAM CORE LOCALIZED AT THE MID-SPAN OF THE TUBE

[75] Inventor: Joseph S. Wycech, Grosse Pointe Woods, Mich.

[73] Assignee: MPA Diversified Products, Inc., St. Clair Shores, Mich.

[21] Appl. No.: 475,396

[22] Filed: Feb. 5, 1990

[51] Int. Cl.⁵ .............. B32B 1/06; B32B 1/08; B60J 5/00; C08J 9/22

[52] U.S. Cl. .......................... 428/35.8; 52/793; 52/810; 264/46.6; 296/146; 296/188; 428/36.5; 428/71

[58] Field of Search .......... 428/35.8, 36.5, 71; 296/146, 188; 264/46.6; 52/793, 810

[56] References Cited

U.S. PATENT DOCUMENTS

| | | | |
|---|---|---|---|
| 3,868,796 | 3/1975 | Bush | 52/618 |
| 3,964,208 | 6/1976 | Renner et al. | 49/502 |
| 4,013,317 | 3/1977 | Reidelbach et al. | 296/146 |
| 4,090,734 | 5/1978 | Inami et al. | 296/146 |
| 4,307,911 | 12/1981 | Pavlik | 296/188 |
| 4,378,395 | 3/1983 | Asoshina et al. | 428/158 |
| 4,737,407 | 4/1988 | Wycech | 428/323 |
| 4,751,249 | 6/1988 | Wycech | 521/54 |
| 4,836,516 | 6/1989 | Wycech | 267/279 |
| 4,861,097 | 8/1989 | Wycech | 52/810 |
| 4,923,902 | 5/1990 | Wycech | 521/54 |

FOREIGN PATENT DOCUMENTS 0236291 9/1987 European Pat. Off. .
59-34921 2/1984 Japan .

Primary Examiner—William J. Van Balen
Attorney, Agent, or Firm—Dykema Gossett

[57] ABSTRACT

A lightweight, composite beams for reinforcing a vehicle door is provided. The reinforcing beam comprises a metal tube having a longitudinal cavity which is partially filled with a reinforcing polymeric core which in one aspect includes a thermoset or thermoplastic resin-based material. The core is friction fit or mechanically held within the metal tube at the mid-span of the tube. The composite beam includes end pieces which are adapted to be mounted to a vehicle door panel in a door cavity by spot-welds or the like. The horizontally mounted beam provides substantially increased resistance to side impacts to the vehicle door in the event of a collision.

20 Claims, 2 Drawing Sheets

U.S. Patent  Dec. 18, 1990  Sheet 1 of 2  4,978,562
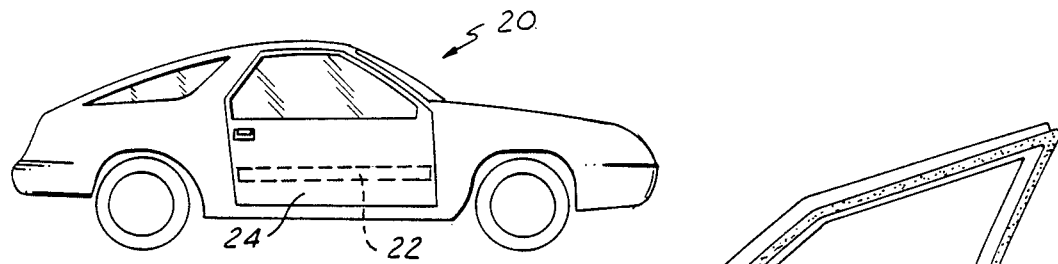
FIG. 1
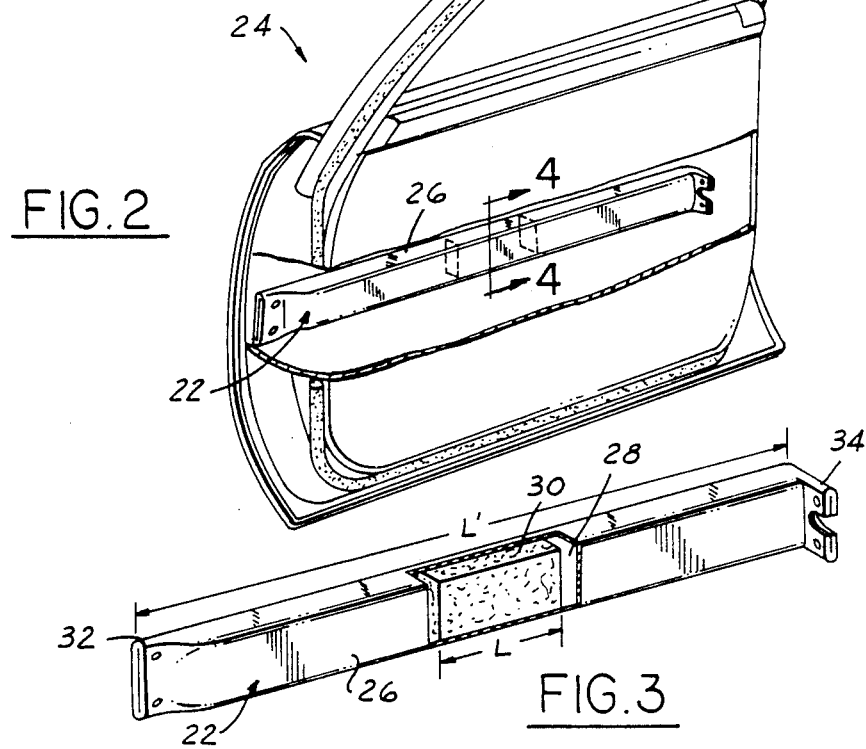
FIG. 2
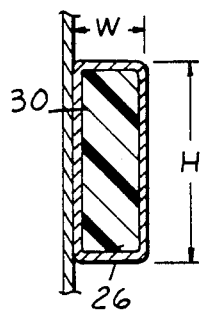
FIG. 4
FIG. 3
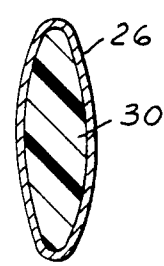
FIG. 5
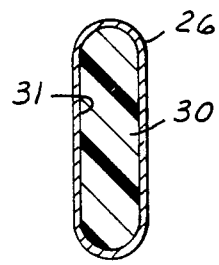
FIG. 6
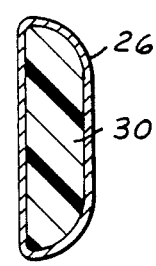
FIG. 7
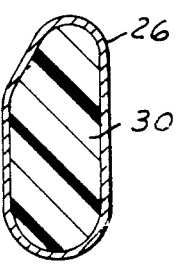
FIG. 8

COMPOSITE TUBULAR DOOR BEAM REINFORCED WITH A SYNTACTIC FOAM CORE LOCALIZED AT THE MID-SPAN OF THE TUBE

TECHNICAL FIELD

The present invention relates generally to vehicle door reinforcements, and more specifically provides a composite tubular door beam having a syntactic foam core localized at the mid-span of the tube.

BACKGROUND OF THE INVENTION

Modern motor vehicle design emphasizes safety features which protect vehicle occupants in the event of a collision. To this end, reinforced structures have been developed with the objective of increasing motor vehicle body strength without unduly increasing overall vehicle weight and cost.

As will be appreciated by those skilled in the art, perhaps the most significant advance in recent years in materials technology for motor vehicle design is the development of composite materials. In that regard, the inventor of the present invention has developed a number of composite structures and methods of forming composites and their constituent elements. For example, in U.S. Pat. No. 4,737,407 which issued Apr. 12, 1988, the inventor of the present application discloses thermoset plastic pellets and a method and apparatus for making the pellets. In U.S. Pat. No. 4,751,249 which issued June 14, 1988, the inventor of the present invention discloses a reinforcement insert for a structural member and a method of making and using the insert. In U.S. Pat. No. 4,836,516 (the disclosure of which is incorporated herein by reference), the inventor of the present invention discloses a filled tubular torsion bar which is reinforced by a mixture of a resin-based filler. In U. S. Pat. No. 4,923,902, issued May 8, 1990 (the disclosure of which is incorporated herein by reference), the present inventor discloses a method of making a composite door beam which is mounted within the door cavity of a vehicle. The door beam includes a lightweight channel-shaped member having a foam core disposed therein.

Most motor vehicle doors generally have an outer door panel or skin and an inner door panel in spaced relation such that a door cavity is defined. Disposed within the door cavity are various door systems such as locking mechanisms and lowerable window actuating means. Without further structural reinforcements, these hollow motor vehicle doors are often not adequately resistant to side impacts. That is, when a motor vehicle door of this type is struck during a collision or the like, the inner and outer door panels offer only limited resistance to side intrusion. Hence, it will be appreciated that there is a need for structurally reinforced motor vehicle doors to provide greater impact resistance.

Reinforcing structures, known variously as impact beams, intrusion beams, guard beams and the like, have also been proposed by others for use in motor vehicle doors to provide improved side impact resistance. For example, U.S. Pat. No. 4,090,734 to Inami et al., entitled "Reinforcement Member for an Automobile Door," discloses a door beam that provides side impact-resistant strength to a vehicle door. The door beam includes a central section formed from a plate having end pieces attached thereto. The central section is disclosed as having an undulation. In U.S. Pat. No. 3,964,208 to Renner et al., entitled "Door for Vehicle, Especially Passenger Motor Vehicle," there is disclosed a reinforced motor vehicle door which includes an intermediate panel with undulations which form cavities when mated to the outer door skin. It is stated that these cavities can be filled with a synthetic resin-based foam material. In U.S. Pat. No. 4,378,395 to Asoshina et al., entitled "Reinforcing Material," a material for reinforcing a panel is disclosed which includes a resin that conforms to a preselected surface of a vehicle door. In U. S. Pat. No. 3,868,796 to Bush, entitled "Side Door Intrusion Protection," a composite beam for reinforcing an automobile door is disclosed in which the outer skin panel of the vehicle door is integrated as part of the beam. A corrugated inner panel is welded to the outer skin, and the voids created thereby are filled with foam.

In U.S. Pat. No. 4,013,317 to Reidelbach et al., entitled "Lateral Protection for Motor Vehicles," a door beam and door reinforcement structure are disclosed which comprise a sheet-metal closure panel. In U. S. Pat. No. 4,3807,911 to Pavlik, entitled "Reinforcement Means for Resisting Side Impacts Against an Automobile Door," a horizontal door beam reinforcement is disclosed which includes a beam that is secured by an adhesive or the like to the outer door panel. The beam may include channel sections for increased strength. In European Patent Application No. 87-251774/36, a reinforcement structure is disclosed for a car door which comprises a plastic layer in which a metal reinforcing strip is embedded. In European Patent No. 59-34921, a hat-shaped section in the nature of an impact beam is described which is mounted within a vehicle door to increase side impact strength.

As will be appreciated by those skilled in the art, Federal Motor Vehicle Safety Standards mandate that vehicle side doors have a minimum specified strength in resisting side impacts. Side intrusion resistance is typically measured with a hydraulic ram which is pressed into the outer door panel. As the door is crushed 18 inches into the vehicle, specific loads must be met.

In order to more fully appreciate the performance characteristics of the present invention, an explanation of flexure theory of a simple beam will now be described. In a simple beam, the beam are being supported such that the span between the supports is free to move in the vertical plane under a load perpendicular to the transverse beam axis. In three-point beam deflection testing, and referring now to FIG. 9 of the drawings, a load P perpendicular to the transverse axis of beam A having span L is applied at the mid-point of the beam. In other words, FIG. 9 illustrates a simple beam having a concentrated load applied an equal distance from the end supports. Accordingly, the maximum bending moment (lb.-in.) is equal to the Product of P, concentrated load (lb.) times the length of the beam (in.) divided by 4:

$$M = \frac{PL}{4}$$

Graphically, in terms of a moment diagram this relationship is shown in FIG. 10 of the drawings. The theoretical maximum elastic deflection at the center of the span may be determined as follows:

$$Y = \frac{MPL^3}{48EI}$$

Where Y is maximum deflection in inches, P is concentrated load in pounds, E is modulus of elasticity in PSI, and I is moment of inertia in inches raised to the fourth power. As will be explained more fully herein, the novel impact beam provided by the present invention optimizes the beam's strength for centrally disposed loads in a highly effective manner which reduces both cost and beam weight.

It will be appreciated that the peak bending load of an impact beam is a function of the tensile strength of the beam. Hence, for the purposes of impact beam performance, it is desirable to optimize the ratio of the maximum bending moment to the tensile strength of the beam. In addition, it is also known that the desired performance characteristics of a particular beam structure are difficult to obtain in those designs which exhibit buckling during deformation. Buckling often occurs in door beams which are formed as hollow round tubes or single hat-shaped structures.

Although large, heavy, structural reinforcements provide increased side-intrusion resistance, they also add to the total vehicle weight and usually increase material production costs. Moreover, in new automotive designs there is less space available within the vehicle for the placement of reinforcement door beams. Therefore, it would be desirable to provide a lightweight, compact door beam having a design which easily fits within a vehicle door cavity. By providing a strong yet lightweight door beam, total mass savings could be achieved. In addition, it would be desirable to provide such a door beam which could easily be fabricated from a minimum number of parts. The present invention provides such an impact or intrusion door beam having the aforementioned desirable characteristics and features.

Therefore, it is an object of the present invention to provide an improved lightweight composite impact beam for use in reinforcing a motor vehicle door.

Still another object of the present invention is to provide an improved impact-resistant motor vehicle door.

It is also an object of this invention to provide a method of manufacturing a composite impact beam having a syntactic foam core localized at the beam mid-span.

SUMMARY OF THE INVENTION

In accordance with the present invention, a lightweight, compact, composite door beam is provided having a syntactic foam core localized at the mid-span of the beam. The door beam of the present invention can be easily mounted in the cavity of a hollow motor vehicle door of the type having an outer panel or skin and an inner panel. The door beam structurally reinforces the vehicle door to provide greater impact resistance to side impacts which may be sustained in a collision.

The novel door beam comprises a metal body in the form of a tube in which a core of filler material is disposed The core or filler member is composed of a reinforcing filler material and is disposed within the tube bore, with the core being localized at the mid-span of the tube. It is preferred that the core occupy only the center 6 to 12 inches of the tube. The reinforcing material from which the core is comprised is preferably a synthetic resin-based material Hence, the door beam is a composite structure. Most preferably, the core is formed of a syntactic foam. The core material is held within the bore of the beam by friction or by mechanical means, but is not bonded to the tube wall. At each end of the beam, mounting means are attached by which the beam can be mounted inside a door cavity to at least one door panel. Preferably, the mounting means comprise integral end pieces or end tabs having a shape corresponding to mating surfaces on the door panel to which the beam is secured.

The present invention also provides a reinforced vehicle door. The automotive door has an outer panel or skin and an inner panel which defines a door cavity that encloses various door hardware. The vehicle door is substantially reinforced against side intrusion by virtue of the novel door beam of the present invention which is mounted horizontally inside the vehicle door. In one embodiment, the end pieces of the beam are secured to the inner door panel by spot welds or the like.

In still another aspect, the present invention provides a method for fabricating the novel door beam of the present invention. In substance, a metal tube in provided which is formed by conventional tube rolling techniques. A resin-based core is formed as a discrete element which is then inserted into the bore of the tube. The core is urged into the tube bore to occupy the central 6 to 12 inches of the beam. The core is held in place by a friction fit in the bore or by mechanical means, but is not bonded to the inner wall surfaces of the tube. The presence of the core substantially increases the bend strength and the energy absorption characteristics of the beam. In one embodiment, the end means or pieces are integral with the beam and are formed by stamping or the like after insertion of the core.

Thus, the present invention provides an improved lightweight, compact door beam, a vehicle door which is reinforced with this novel door beam and a method for manufacturing the beam.

BRIEF DESCRIPTION OF THE DRAWINGS

FIG. 1 is a side elevational view of a motor vehicle having the door beam of the present invention installed in the vehicle door.

FIG. 2 is a reinforced vehicle door with the inner door panel broken away to expose the door beam of FIG. 1.

FIG. 3 is the door beam of the present invention in one embodiment broken away to expose the foam core.

FIG. 4 is a cross-section of the door beam of the present invention taken along lines 4—4 of FIG. 2.

FIGS. 5 through 8 illustrate cross-sections of door beams made in accordance with the present invention having various preferred geometries.

DESCRIPTION OF THE PREFERRED EMBODIMENTS

Figure 9:
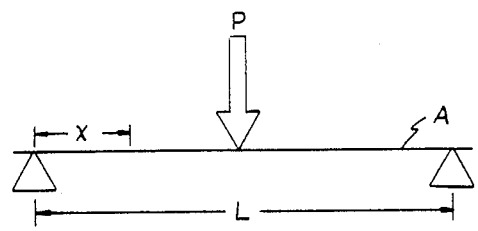
FIG. 9 is a diagram of a simple beam with a cental load.

Referring now to the drawings in which like reference numerals designate like parts and, more specifically, with reference to FIG. 1 of the drawings, motor vehicle 20 is shown in which composite door beam 22 is provided mounted within motor vehicle door 24 in the right-hand configuration. In the preferred embodiment, and referring now to FIGS. 2 and 3 of the drawings, door beam 22 includes body or tube 26 which defines tube bore 28 in which core 30 is disposed. The length of core 30 is preferably less than one-third the length of beam 22. Most preferably, core 30 occupies the center 6 to 12 inches (length) of tube 26. In other words, length L of core 30 is from about 6 to about 12 inches, and in the most preferred embodiment, core 30 is disposed in tube 26 at the mid-section of tube 26. Core 30 is preferably positioned such that it is equidistant from each end of tube 26. Significant advantages are attained in the present invention by the relative length of core 30 and by its placement in tube 26 such that core 30 occupies less than a third of the length L' of tube 26. In this manner, only that region of beam 22 which would receive a load in a centered-load, three-point beam deflection test is reinforced. However, it is contemplated that in some applications it may be desirable to place core 30 in a portion of tube 26 other than the mid-section and placement which is offset from the midpoint is contemplated as falling within the present invention in an alternative embodiment.

Therefore, it will be seen that in one embodiment, the present invention provides superior results by the placement of a reinforcement core in only a portion of a door beam, where the core occupies less than approximately one-third of the beam length. Not only does this design reduce both the weight of beam 22 and its cost (due to the cost factors associated with core 30), but the present invention provides an impact beam of high-strength characteristics localized in the region where they are most needed.

Referring now to FIG. 3 of the drawings, beam 22 is shown having mounting means or end piece 32 at one end of tube 26 and mounting means or end piece 34 at the other end of tube 26. The length L' of beam 22 is typically from about 30 to 48 inches and bore 28 is substantially coextensive therewith. The width W of beam 22 as shown in FIG. 4 is typically about 1 to 2 inches. Similarly, the beam height H will typically be from about 2 to 4 inches. In those instances where it is necessary to minimize the beam height, beam strength can be maintained by enlarging the beam width. Conversely, if a narrower door beam is needed, the loss and strength produced by narrowing the beam can be compensated by increasing the beam height.

Although a number of metals may be suitable, steel is the preferred metal for use in forming tube 26 of beam 22 and mounting end pieces 32 and 34. The gage (in inches) of the metal should be from about 0.040 to about 0.125, preferably from about 0.060 to about 0.100, and most preferably from about 0.070 to about 0.095. Preferred types of steel include HSLA 980, dual-phase 120, 140, chrome molybdenum, and high carbon 1526 alloy. Other metals may be appropriate or even suitable in some instances. In the present invention, the preferred steel should exhibit a minimum tensile elongation of 10%.

Referring now to FIGS. 2 and 3 of the drawings, end pieces 32 and 34 are shown adapted to be mounted to the inner door panel of vehicle door 24. Thus, end pieces 32 and 34 must conform to suitable mating surfaces of the inner door panel to which beam 22 is mounted. The means by which beam 22 is mounted in vehicle door 24 is preferably by spot welding beam 22 in position at end pieces 32 and 34. Five or more spot welds at each end piece 32, 34 are generally sufficient to form a rigid, reliable attachment.

Referring now to FIG. 4 and FIGS. 5 through 8, there are several preferred geometries for tube 26 for use in the present invention. Most preferred is that shown in FIG. 4 which is a generally rectangular cross-section that provides exceptional strength in the present invention. Also preferred are the ellipse shown in FIG. 5, the oval of FIG. 6, the half-oval of FIG. 7 and the corner truncated oval of FIG. 8. All of these configurations provide superior strength characteristics in accordance with the present invention.

Referring now to FIG. 3 of the drawings, and as previously stated, an important feature of the present invention is that core 30 is not bonded to the inner surface of tube 26. In most instances, core 30 will be held in place by a close friction fit or mechanical interference such as a dimple, a pierced dart, or by weld flash 31 formed on the inner surface of tube 26 as shown in FIG. 6. In other words, the outer surface of core 30 is in contact with the inner surface of tube 26 and is closely received therein such that core 30 is held in place. Thus, core 30 does not move within bore 28 of tube 26 under normal conditions. By not bonding core 30 to the inner surface of tube 26, unexpected superior results are achieved during application of a load to beam 22. More specifically, as stated and as will be more fully explained hereinafter, core 30 is formed of a material which imparts high compressive strength such that metal tube 26 flexes during deformation without buckling locally at the mid-span. That is, core 30 functions as an internal forming mandrel such that the steel deforms over the core and absorbs energy in this manner. Importantly, this non-bonded relationship between core 30 and tube 26 allows tube 26 to slip over core 30 during deformation which in turn allows the steel to stretch. Bonding of the core to tube 26 causes premature cracking of the metal due to the lack of strain relief on the tension side of beam 22. In the present invention, as beam 22 deflects, core 30 cracks and forms small columns of support inside tube 26 which prevent buckling of tube 26.

In addition, by using a tube in the manufacture of beam 22, as opposed to a single hat section, important advantages are achieved. More specifically, it will be appreciated that the importance of a door beam section is to displace as much material away from the neutral axis as possible. By using a tube, the three-inch to four-inch widths act as flanges of an I beam with the core serving as an internal support to the flanges. This prevents buckling and transfers the load properly.

Figure 10:
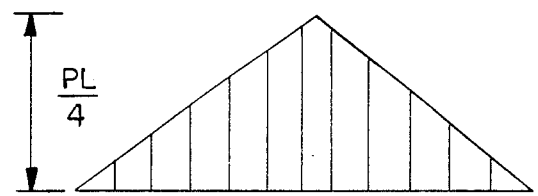
FIG. 10 is a moment diagram of the simple beam of FIG. 9.
Figure 11:
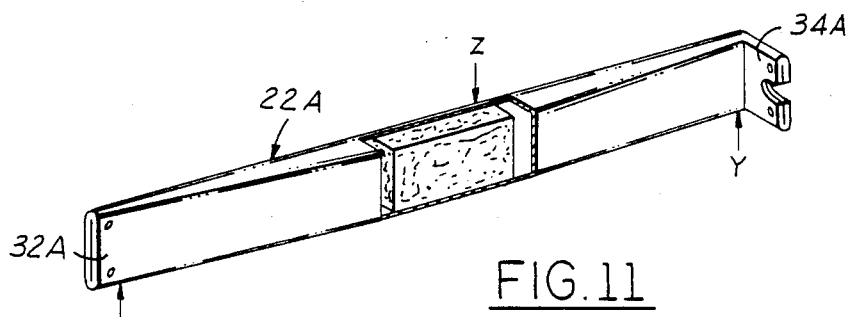
FIG. 11 is the door beam of the present invention in another embodiment.

Moreover, with respect to the rectangular configuration of beam 22 shown in FIGS. 2, 3 and 4, although the rectangular tube has a uniform thickness, the reinforcement provided by the core is such that the beam 22 performs in a three-point deflection test as if tube 26 were tapered with a thick portion at the center, i.e., tapering toward end pieces 32 and 34. This gives optimum performance as a triangular moment diagram as shown in FIG. 10. Accordingly, in another embodiment of the present invention as shown in FIG. 11, this principle is used wherein beam 22A is tapered toward end portions 32A and 34A. The difference in dimension W, i.e., the width of beam 22A at points X and Y as compared to point Z, is approximately 3 to 4 inches greater. The tapering is most preferably uniform from the center of beam 22A to each end of the beam.

As stated, the composition of core 30 imparts excellent mechanical strength to door beam 22, particularly its bending strength, and yet adds only marginally to the overall weight of beam 22. With specific reference now to the composition of core 30, the density of core 30 should be from about 15 pounds per cubic feet to about 40 pounds per cubic feet to minimize weight. An important feature of the present invention is the compressive strength exhibited by core 30 which should be at least about 1,000 pounds per square inch and most preferably about 2,000 pounds per square inch or greater. Preferably, core 30 should not exhibit more than 10% elongation under dynamic impact. As stated, it is important that core 30 not be bonded to metal tube 26.

The melting point of core 30, heat distortion temperature and the temperature at which chemical breakdown occurs must also be sufficiently high such that core 30 substantially maintains its structure at high temperatures typically encountered in paint ovens and the like. Therefore, core 30 should be able to withstand temperatures in excess of 300 degrees F. and preferably 350 degrees F for short times absent any significant applied stress. Also, core 30 should be able to withstand heats of about 180 degrees F. to 220 degrees F. for extended periods without exhibiting substantial heat-induced distortion or degradation.

Figure 12:
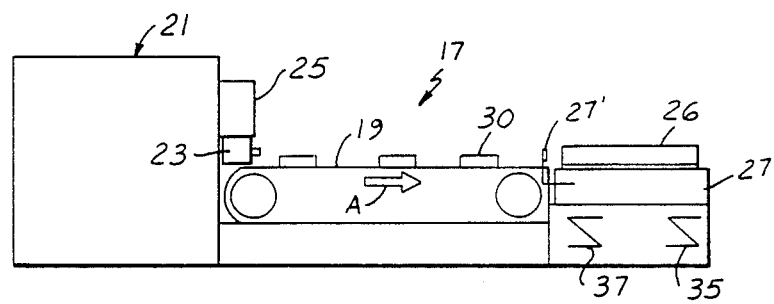
FIG. 12 is a diagramatic illustration of an apparatus for use in making the door beam of the present invention.

Beam 22 may be formed by several techniques. One preferred method, and referring now to FIG. 12 of the drawings, utilizes fabrication apparatus 17. Accordingly, apparatus 17 includes a moving endless belt 19 upon which multiple cores 30 are formed and moved into position relative to tube 26. More specifically, extruder 21 is charged with the constituents which make up core 30. This mixture is then extruded as a strand through die 23. At preselected intervals, the strand is cut by knife 25 to form cores 30 of preselected lengths. In other words, a strand of material is extruded on conveyor belt 19 as it moves in the direction of arrow A and is cut to length at die 23. Multiple tubes 26 are presented by way of a second endless belt 27 which moves perpendicular to the movement of belt 19. At predetermined intervals, belt 27 stops such that the end of tube 26 is positioned to receive core 30. Arm 27 then pivots to urge core 30 into the end of tube 26 (into bore 28). As core 30 is extruded it should have sufficient body for subsequent steps, but may in some instances require further curing on belt 19 by IR radiation or the like. Once inserted into the mouth of tube 26, articulated rams 35 and 37 move into position at each end of tube 26 and to move core 30 to the midpoint of tube 26 and to compress core 30 somewhat so that it completely fills the designated area of from about 6 to about 12 inches. A lubricant on belt 19 may be necessary to facilitate movement of core 30 into tube 26 and mill oil in tube 26 allows core 30 to slide into place. Moreover, where fabrication is carried out in this manner, mill oil in tube 26 allows core 30 to finish curing without bonding to the tube walls. A subsequent cure of core 30 may also be achieved by heat treatment of beam 22 after fabrication and possibly after it is inserted in a vehicle door cavity.

Alternatively, core 30 may be precast by preparing a liquid or paste-like reinforcing material which is then injected or poured into a mld having dimensions matching those of bore 28 in which core 30 is closely received. The reinforcing material is hardened by curing or cooling to form core 30. A metal tube is provided as tube 26 which is formed by conventional tube-rolling techniques. Core 30, after it has cured, is urged into the tube bore 28 to occupy the central 6 to 12 inches of the beam. As stated, core 30 is held in place by friction fit or by mechanical means in bore 28, but is not bonded to the inner wall surfaces of tube 26. In one embodiment, the end of means or pieces 32, 34 are then formed by stamping or the like. In another embodiment, core 33 is precast from pellets which are fully described in my U.S. Pat. Nos. 4,737,407 of Apr. 12, 1988 and 4,751,249 of June 14, 1980 (the disclosures of which are incorporated herein by reference). Therein, the pellets are heated to partially melt a surface layer or region of the pellets such that the pellets bond together in a mold cavity to form a matrix having interstices. Core 30 is thereafter inserted into position.

In more detail, core 30 includes a synthetic resin, a cell-forming agent, and a filler. A synthetic resin comprises from about 35.0 percent to about 95.0 percent by weight, preferably from about 75.0 percent to about 94.0 percent by weight, and most preferably from about 78.0 percent to about 90.0 percent by weight of core 30. As used herein, the term "cell-forming agent" refers generally to agents which produce bubbles, pores, or cavities in core 30. That is, core 30 has a cellular structure, having numerous cells disposed throughout its mass. As will be seen, this cellular structure provides a low-density, high-strength material, which, in the structure of door beam 22, provides a strong, yet lightweight member. Cell-forming agents which are compatible with the present invention include reinforcing "hollow" microspheres or microbubbles which may be formed of either glass or plastic. Plastic microspheres may be either thermosetting or thermoplastic and either expanded or unexpanded. In one embodiment, unexpanded microspheres are used which are then expanded in a mold cavity to form core 30. The preferred microspheres are from about 1.0 to about 250 and preferably from about 10 to about 180 microns in diameter. The cell forming agent may also comprise a larger lightweight material such as macrospheres of greater than 400 microns in diameter. Also, the cell-forming agent may compromise a blowing agent which may be either a chemical blowing agent or a physical blowing agent. Glass microspheres are particularly preferred. Where the cell-forming agent comprises microspheres or macrospheres, it constitutes from about 1.0 percent to about 60.0 percent by weight, preferably from about 1.0 percent to about 35.0 percent by weight, and most preferably from about 3.0 percent to about 20.0 percent by weight of core 30. Where the cell-forming agent comprises a blowing agent, it constitutes from about 1.0 percent to about 10.0 percent by weight, preferably from about 1.0 percent to about 5.0 percent by weight, and most preferably from about 3.0 percent to about 5.0 percent by weight of core 30. Suitable fillers include glass or plastic microspheres, fumed silica, calcium carbonate, milled glass fiber, and chopped glass strand. Glass microspheres are particularly preferred. Other materials may be suitable. A filler comprises from about 1.0 percent to about 55.0 percent by weight, preferably from about 5.0 percent to about 24.0 percent by weight and most preferably from about 7.0 percent to about 19.0 percent by weight of core 30.

Preferred synthetic resins for use in the present invention include thermosets such as epoxy resins, vinyl ester resins, thermoset polyester resins, and urethane resins. The average molecular weight of the resin component is from about 1,000 to about 5,000,000 and preferably from about 10,000 to about 1,000,000, although molecular weights outside of these ranges may be suitable or desirable in some applications. It is not intended that the scope of the present invention be limited by molecular weight of the resin. Where the resin component of the liquid filler material is a thermoset resin, various accelerators, such as "EMI-24" (imidazole accelerator) and "DMP-30," and curing agents, preferably organic peroxides such as "MEK" peroxide and "Percadox," may also be included to enhance the cure rate. A functional amount of accelerator is typically from about 0.1 percent to about 4.0 percent of the resin weight with a corresponding reduction in one of the three components, resin, cell-forming agent or filler. Similarly, the amount of curing agent used is typically from about 1 percent to about 4 percent of the resin weight with a corresponding reduction in one of the three components, resin, cell-forming agent or filler. Effective amounts of processing aids, stabilizers, colorants, UV absorbers and the like may also be included in core 30. Thermoplastics may also be suitable.

In the following tables, preferred formulations for core 30 are set forth. It has been found that these formulations provide a core 30 which imparts unexpected superior strength to door beam 22.

| Formula I | | Formula II | |
| --- | --- | --- | --- |
| Ingredient | Percentage by Weight | Ingredient | Percentage by Weight |
| Polyester Resin ("AZS-137-69") | 80.9 | "Interez 504 Epoxy" | 56 |
| "Percadox 16N" | 1.1 | "Interez 855 Hardener" | 26 |
| "3M C15" | 18 | "3M C15" | 18 |

| Formula III | | Formula IV | |
| --- | --- | --- | --- |
| Ingredient | Percentage by Weight | Ingredient | Percentage by Weight |
| Polyester Resin ("ARISTECH 13031") | 48.8 | "Interez 510 Epoxy" | 59.4 |
| "Percadox 16N" | 0.7 | "Interez 501 Epoxy diluent" | 6.6 |
| "SG Micros" (PA IND) | 50.5 | "EMI 24" | 1.5 |
| | | "3M B23" | 21.5 |
| | | "SG Micros" | 11 |

It is to be understood that the reinforcing material from which core 30 is formed is such that core 30 reinforces tube 26 so that tube 26 resists collapse during the gross deflection of door beam 22. Without core 30, tube 26 would buckle prematurely. If door beam 22 were allowed to buckle, it would lose its structural efficiency and load-carrying capacity. It is preferred that the weight of core 30 not exceed about 4.5 pounds. It is preferred that the overall weight of door beam 22 be less than 12 pounds and most preferably less than 10 pounds for two-door vehicles. Core 30 provides from about 40 percent to about 100 percent or more increase in the load-carrying capacity of door beam 22.

While a particular embodiment of this invention is shown and described herein, it will be understood, of course, that the invention is not to be limited thereto since many modifications may be made, particularly by those skilled in this art, in light of this disclosure. It is contemplated, therefore, by the appended claims, to cover any such modifications as fall within the true spirit and scope of this invention.

What is claimed is:

1. A lightweight, composite reinforcing door beam adapted to be mounted in the cavity of a motor vehicle door which has an outer panel and an inner panel, the door beam providing structural reinforcement in the form of increased side-impact resistance when mounted in the cavity of the vehicle door, the door beam comprising:
   a metal tube having a longitudinal axis and having a bore coextensive therewith;
   a resin-based core disposed in said bore of said metal tube, said bore occupying not more than one-third of the length of said bore;
   said core being positioned substantially at the midspan of said metal tube;
   said core being held in place in said bore of said tube; and
   first and second mounting means disposed at opposite ends of said body and adapted for mounting the door beam in the cavity of the vehicle door, with the longitudinal axis of the door beam positioned horizontally with respect to the vehicle door, thereby increasing the side-impact resistance of the vehicle door.

2. The lightweight, composite door beam recited in claim 1, wherein said door beam is mounted to said inner panel of said vehicle door.

3. The lightweight, composite door beam recited in claim 1, wherein said core includes from about 35 to about 95 by weight synthetic resin, from about 1 to about 60 by weight cell-forming agent, and from about 1.0 to about 55 by weight filler.

4. The lightweight, composite door beam recited in claim 1, wherein said first and second mounting means are end pieces and said end pieces are integral with said body.

5. The lightweight, composite door beam recited in claim 3, wherein said synthetic resin is selected from the group consisting of thermoplastic and thermosetting resins.

6. The lightweight, composite door beam recited in claim 3, wherein said cell-forming agent comprises microspheres.

7. The lightweight, composite door beam recited in claim 3, wherein said cell-forming agent comprises a blowing agent selected from the group consisting of chemical blowing agents and physical blowing agents.

8. The lightweight, composite door beam recited in claim 3, wherein said filler is selected from the group consisting of glass microspheres, plastic microspheres, fumed silica, calcium carbonate, milled glass fiber and chopped glass strand.

9. A reinforced vehicle door comprising:
   an inner door panel and an outer door panel joined to define a door cavity;
   a lightweight, composite door beam within said door cavity;
   said door beam having a longitudinal metal tube that defines a bore;
   a resin-based core disposed in said bore, said core occupying no more than one-third of the length of said bore;
   said core being positioned substantially at the midspan of said metal tube;
   said core being held in place in said bore of said tube; and first and second mounting means disposed at opposite ends of said metal tube for mounting said door beam in said cavity of said vehicle door.

10. The invention recited in claim 9, wherein said core includes from about 35 to about 95 by weight synthetic resin, from about 1 to about 60 by weight cell-forming agent and from about 1.0 to about 55 by weight filler.

11. The invention recited in claim 9, wherein said first and second mounting means are end pieces and said end pieces are integral with said body.

12. The invention recited in claim 9, wherein said synthetic resin is selected from the group consisting of thermoplastic and thermosetting resins.

13. The lightweight, composite door beam recited in claim 9, wherein said cell-forming agent comprises microspheres.

14. The lightweight, composite door beam recited in claim 9, wherein said cell-forming agent comprises a blowing agent selected from the group consisting of chemical blowing agents and physical blowing agents.

15. The lightweight, composite door beam recited in claim 9, wherein said filler is selected from the group consisting of glass microspheres, plastic microspheres, fumed silica, calcium carbonate, milled glass fiber and chopped glass strand.

16. A method of forming an impact beam comprising the following steps:
  (a) providing a metal tube defining a bore;
  (b) providing a resin-based core adapted to be received within said metal tube, said core having a length not greater than one-third the length of said metal tube; and
  (c) sliding said core into said bore of said metal tube such that said core occupies the mid span of said metal tube.

17. The invention recited in claim 1, wherein said core includes from about 35 to about 95 by weight synthetic resin, from about 1 to about 60 by weight cell-forming agent, and from about 1.0 to about 55.0 by weight filler.

18. The invention recited in claim 16, further including the steps of forming first and second mounting means integral with said metal tube.

19. The invention recited in claim 17, wherein said synthetic resin is selected from the group consisting of thermoplastic and thermosetting resins.

20. The lightweight, composite door beam recited in claim 17, wherein said cell-forming agent comprises microspheres.

* * * * *